(No Model.) 2 Sheets—Sheet 1.

C. S. BRADLEY.
ELECTRIC MOTOR.

No. 404,465. Patented June 4, 1889.

WITNESSES:
Emile Henkel
J. C. Spaeth

Charles S. Bradley, INVENTOR,
BY
McTigher & Worthington
ATTORNEY (No Model.) 2 Sheets—Sheet 2.

C. S. BRADLEY.
ELECTRIC MOTOR.

No. 404,465. Patented June 4, 1889.

UNITED STATES PATENT OFFICE.

CHARLES S. BRADLEY, OF YONKERS, NEW YORK.

ELECTRIC MOTOR.

SPECIFICATION forming part of Letters Patent No. 404,465, dated June 4, 1889.

Application filed October 5, 1888. Serial No. 287,319. (No model.)

*To all whom it may concern:*

Be it known that I, CHARLES S. BRADLEY, a citizen of the United States, residing at Yonkers, in the county of Westchester and State of New York, have invented certain new and useful Improvements in Electric Motors; and I do hereby declare the following to be a full, clear, and exact description of the invention, such as will enable others skilled in the art to which it appertains to make and use the same.

This invention relates to a new principle of construction for the field-magnet of electric motors.

In dynamo-electric machines and electric motors generally it has hitherto been considered essential to successful operation either to have the field-magnet positively energized by means of a current or currents circulating in insulated conductors wound upon the field-magnets or else to have the field-magnets made of steel and permanently magnetized. It has always been generally considered advisable to laminate the pole-pieces of the field-magnets for the purpose of preventing the generation of the Foucault currents therein. I have discovered, on the contrary, that such currents may serve a useful purpose in the motor or machine, and they may be so concentrated and directed as to form the sole energizing-current of the field-magnets, and such discovery forms the basis of my present invention, which, briefly, consists in an electric motor (or dynamo-electric machine) of any class to which the invention is applicable having its field-magnets energized by currents induced in the mass of the magnet itself as distinguished from the magnetism produced in the field-magnet by a current or currents circulating in insulated conductors wound upon the magnet; and the invention further consists in the construction, arrangement of parts, and their combination, all substantially as hereinafter fully described and claimed.

Figure 1:
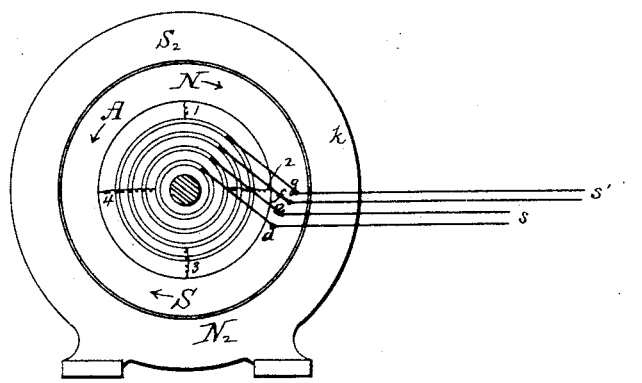
Figure 2:
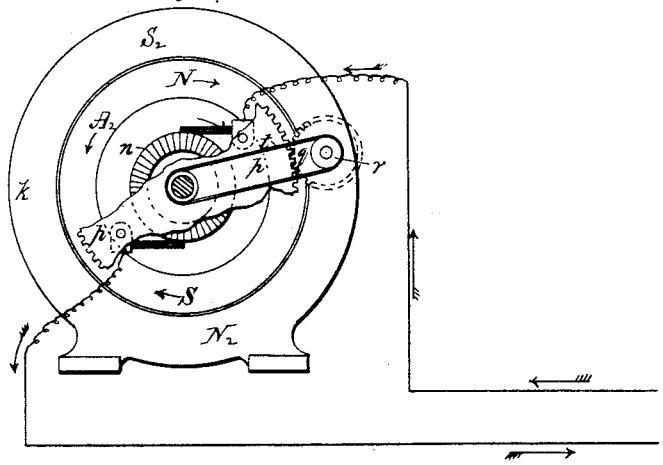
Figure 3:
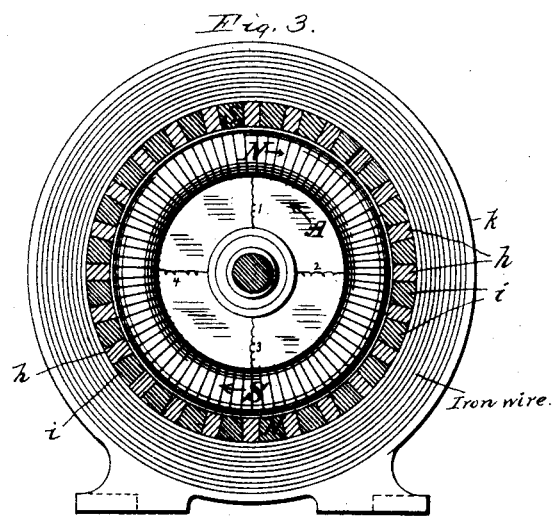
Figure 4:
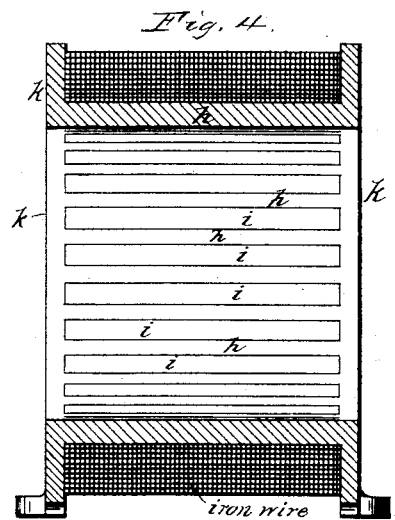

In the drawings which form part of this specification, Figure 1 is a diagram illustrating the principle of my invention as applied to an alternating-current motor. Fig. 2 is a like diagram illustrating my invention as applied to a continuous-current motor. Fig. 3 represents in partial cross-section an electric motor of what I term the "quarter-phase" type, having a field-magnet constructed in accordance with my present invention. Fig. 4 is a longitudinal vertical section of the said field-magnet without the armature, and Fig. 5 is an elevation of an armature of the quarter-phase type apart from its field-magnet.

In the construction of the field-magnet I may surround the armature simply with a cylindrical mass of iron, either cast-iron or wrought, and the effect which I have already discovered can be produced will take place in such a plain cylindrical magnet; but for the sake of efficiency I prefer the following construction, which is clearly shown in Figs. 3 and 4: I first form a skeleton spool or cylinder composed of the longitudinal bars $h$ and heads $k$, leaving around the periphery a number of equidistant slots or openings, which are filled with the iron bars $i$, so as to present a flush cylindrical surface on the interior and a similar surface on the exterior, thus leaving a space on the outside of the entire structure, which I then proceed to wind with plain naked iron wire of any suitable size and shape, or I may wind it with hoop-iron, or it may be constructed of thin disks of iron stamped out and slipped onto the spool. By this construction I obtain a cylinder consisting largely of iron and having copper or high-conductivity bronze heads and ribs extending internally between the bars of iron, which may be considered as constituting the pole-pieces.

Figure 5:
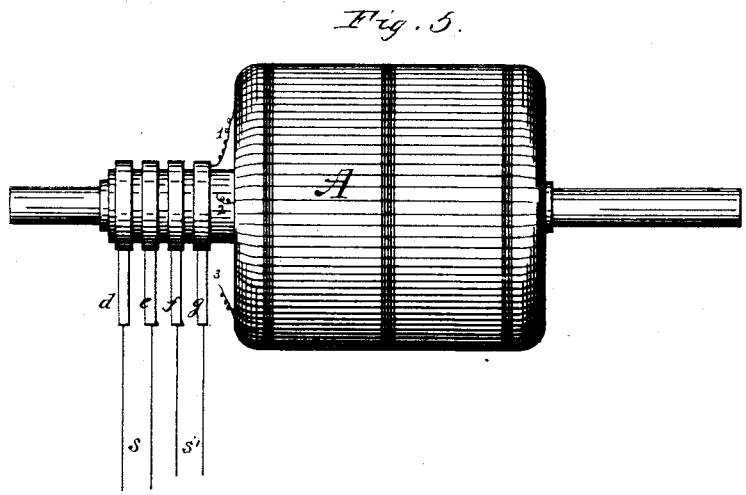

The armature $A$ may be of various types; but I prefer that having a closed circuit, as in the ring-type shown at Fig. 1, having at four equidistant points the connections 1, 2, 3, and 4, each leading to one of four contact-rings placed on the shaft, as shown at Fig. 5; but in Fig. 1 I have shown them faced on the armature for more clearly illustrating the principle. Such an armature with its connections is similar to that described and claimed in my patent, No. 390,439, filed May 9, 1887. Current is led into the armature by means of the brushes $d\ e f g$, opposite brushes being connected to the two supply-circuits $s$ and $s'$. These circuits supply alternating currents, the current of one being one-quarter of a phase or wave-length behind the other, as in my said patent, No. 390,439, and the result is to produce a rotation of the armature so long as the currents are supplied, and are substantially one-quarter phase apart in their time-periods, and in producing the rotation of the armature the two consequent poles N and S set up in the armature rotate around in its iron body at a rate exactly corresponding to the speed of the generator. Suppose, now, the speed of the generator, which is of corresponding impulses, is one thousand revolutions per minute. Then the poles N and S will traverse the armature circularly one thousand times per minute, and suppose this motion of the poles N and S to be right-handed, as shown by the arrows at N and S. As they rotate they induce poles in the iron of the field-magnet; but these induced poles $N^2 S^2$ drag behind slightly, and as opposite poles attract, the armature moves in a left-handed direction, as shown by the arrow at A. Meantime the N and S poles in the armature have moved to the right in direction and the motion of the armature continues, and if not doing work obviously it will rise in speed until its speed nearly equals that of the generator, and the relative motion of the poles N S and $N^2 S^2$ becomes so slight as to be practically negligible. Now if work is put upon the armature (the generator being maintained at constant speed) its speed falls, and while the relative rotation of its N and S poles remains unaltered with respect to the armature-body the absolute rotation with respect to a point in space changes accordingly; or, to put it in figures, suppose the speed of the generator is one thousand revolutions per minute, then the poles N and S travel one thousand revolutions per minute relatively to the armature-body. If the armature speed were one thousand revolutions, the poles N and S would stand still with respect to space—i. e., their absolute rotation would be nil. If, now, load is added sufficient to drop the speed of the armature to nine hundred revolutions, obviously the poles N and S while still traveling one thousand revolutions per minute relatively to the armature-body will have an absolute rotation with respect to a point in space of $1000-900=100$ revolutions. The direction of this absolute rotation is, as indicated by arrows at N S, the same as the direction of relative rotation of these poles N and S; but as this absolute rotation of the poles N S is one hundred per minute it necessarily follows that there is a movement of the induced poles $N^2 S^2$ in the field-magnet following the movement of poles N S, and the speed of this movement is one hundred per minute, and each section of the mass of the field-magnet is in turn the seat of a rotating polar line and is cut by lines of force. Therefore, Foucault currents are set up, and their value depends upon the resistance they meet with. The position of the field-poles $N^2 S^2$ induced by these eddy-currents is always behind that of the poles N S, the exact position depending upon two things—the load and the resistance in the metal of the field-magnet. The greater the load the greater the lag of the poles $N^2 S^2$, and, on the other hand, the less the resistance offered the eddy-currents the smaller will this lag become in proportion.

By the construction stated the copper or bronze bars $h$ form paths of exceedingly low resistance, and circuit is completed around through the heads $k$, and the currents thus induced are of great strength and powerfully magnetize the iron portions, and thus the rotary effort is increased just as if the field-magnet were energized in the customary way. Obviously with very low resistance in the bar-circuits a low induced electro-motive force suffices to produce a powerful current, which is independent of the armature-current.

An element of regulation results from the foregoing. If the load is increased, the armature tends to fall in speed, with the result of increasing the speed of the poles $N^2 S^2$, and this causes a rise of the electro-motive force of the induced or Foucault currents, and a consequent increase of magnetism in the poles $N^2 S^2$. If the load be decreased, the reverse occurs and the field magnetism weakens. The same phenomena appear in a continuous-current motor when properly arranged—as, for instance, in Fig. 2. Here a ring-armature $A^2$, having the usual rectifying-commutator $n$, is placed so as to rotate in the cylindrical field-magnet, as in Fig. 1. The usual brushes are applied, and the current from the supply-circuit passes through the ring in multiple circuit and produces the poles N and S, as shown. I arrange the brushes on a toothed disk $p$ free to revolve, which gears with a pinion $q$, which may be suitably journaled on the field-magnet. The shaft of pinion $q$ has a pulley $r$, which is driven from the armature-shaft by a belt $t$, so that while the armature rotates in one direction the brushes are rotated in the opposite direction. The rotation of the brushes produces the rotation of the poles N and S both with respect to the armature-body and with respect to space. If with a load the armature travels nine hundred revolutions per minute and the gearing causes one hundred revolutions of the brushes in the same time in an opposite direction, I have precisely the same result as in the examples given for the alternating-current motor, Fig. 1. It may, however, be necessary to produce mechanically a few turns of the armature of the continuous-current motor in starting, in order to effect angular displacement of the polar lines and get the initial traction effort.

The result of my invention is that the iron pole-pieces and iron winding or body of the field-magnet become highly magnetized without any current being directly taken from the armature-circuit for that purpose, and in this manner the loss in a motor or dynamo as ordinarily constructed, due to the circulation of these Foucault currents, is readily utilized as a factor in the successful operation of the machine.

In some cases, where high efficiency is less important than cheapness of construction, the iron bars $i$ may be omitted, and the bars $h$ of copper or bronze in that event are all united into a cylinder.

Of course in Fig. 2 it will be necessary to have contact-rings and brushes to connect the main brushes to the external circuit while the disk $p$ is rotating, because the latter carries the regular brushes continuously around.

I claim as my invention—

1. An electric motor comprising a field-magnet adapted to be energized by the eddying currents due to the rotation of the poles of the armature, in combination with an armature having magnetic poles rotating independently of its motion.

2. An electric motor comprising a field-magnet adapted to be energized by the eddying currents due to the rotation of the poles of the armature, in combination with an armature having magnetic poles automatically rotating independently of its motion.

3. An electric motor having an armature with insulated winding thereon and connections for the external circuit or circuits, in combination with a field-magnet disconnected from the armature and external circuits, and wherein the effective poles depend for existence on eddying currents circulating in its body.

4. In an electric motor, an armature constructed with no dependently-rotating magnetic poles, in combination with a mass composed partly of a magnetic metal and partly of a low-resistance metal placed in continuous inductive proximity to the armature and constituting its field-magnet.

5. In an electric motor, a rotary armature having independently-rotating magnetic poles, in combination with a surrounding compound annulus, partly iron or steel and partly of a low-resistance metal, the latter arranged in bars or sections parallel with the winding on the armature.

6. A compound annular field-magnet having its surface adjacent to the armature composed of alternate bars of iron or steel and a low-resistance metal—such as copper or bronze—substantially as described, whereby said low-resistance bars form paths for currents.

7. A compound annular field-magnet having its surface adjacent to the armature composed of alternate bars of iron or steel and a low-resistance metal—such as copper or bronze—and having the ends of said low-resistance bars connected to low-resistance heads or cross-bars, substantially as described.

8. A field-magnet composed of alternate bars of magnetic metal and low-resistance metal laid together to form a cylinder and bound externally with magnetic metal, which serves to retain the structure in form and complete the magnetic circuit.

9. A field-magnet composed of alternate bars of magnetic metal and low-resistance metal laid together to form a cylinder and wound externally with iron or steel wire.

In testimony whereof I affix my signature in presence of two witnesses.

CHARLES S. BRADLEY.

Witnesses:
T. J. McTighe,
Anthony Hollis.